United States Patent

Kneusels et al.

[11] 4,038,910
[45] Aug. 2, 1977

[54] SLIDING ROOF FOR AUTOMOBILE ROOFS

[75] Inventors: Max B. Kneusels, Russelsheim; Dieter Federmann, Hainhausen; Rainer Hattass, Grundau, all of Germany

[73] Assignee: American Sunroof Manufacturing Company, Southgate, Mich.

[21] Appl. No.: 673,783

[22] Filed: Apr. 5, 1976

[30] Foreign Application Priority Data

Apr. 4, 1975 Germany .............................. 2514779

[51] Int. Cl.[2] .............................................. B60H 1/24
[52] U.S. Cl. ................................ 98/2.14; 296/137 B; 49/153; 49/226
[58] Field of Search ............................ 98/2.14, 2.15, 2; 296/137 B, 137 E, 137 F, 137 G, 137 H, 137 C, 137 D, 123, 107, 108; 49/152, 153, 209, 215, 226

[56] References Cited

U.S. PATENT DOCUMENTS

| 3,888,165 | 6/1975 | Hattass et al. | 98/2.14 |
| 3,949,624 | 4/1976 | Bienert | 296/137 B |
| 3,955,848 | 5/1976 | Lutz et al. | 98/2.14 |
| 3,974,753 | 8/1976 | Blomgren et al. | 98/2.14 |
| 3,979,148 | 9/1976 | Martin | 98/2.14 |

*Primary Examiner*—John J. Camby
*Assistant Examiner*—Henry C. Yuen

[57] ABSTRACT

A ventilator is positioned in the opening in a motor vehicle roof so that it can be moved between a closed position sealing the opening and a number of different oblique opening positions. Levers attached to the roof and connected to a shaft pivotally mounted on the cover affect the pivotal movement of the cover at its rear end. A mechanism is provided to selectively disconnect those levers from the roof to enable the ventilator to be fully removed, with the links attached to the ventilator.

2 Claims, 5 Drawing Figures

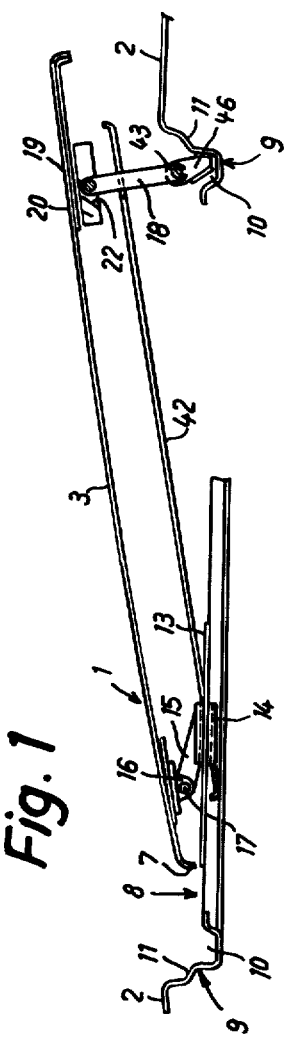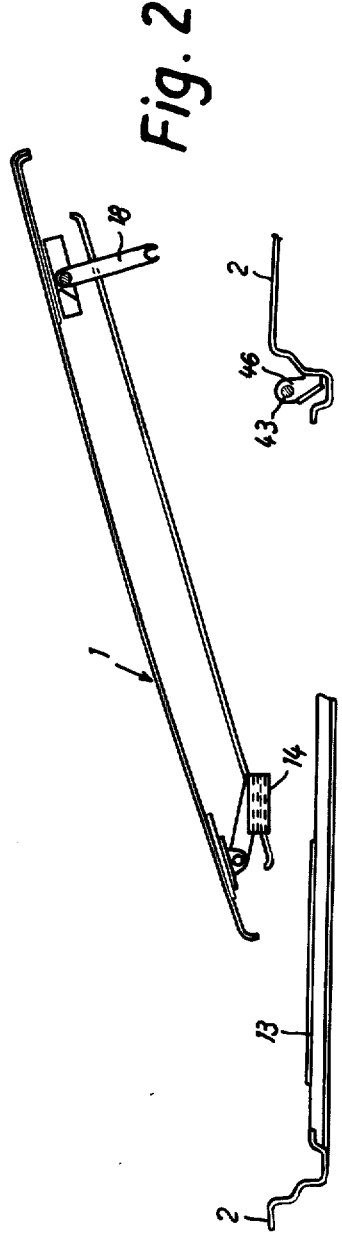

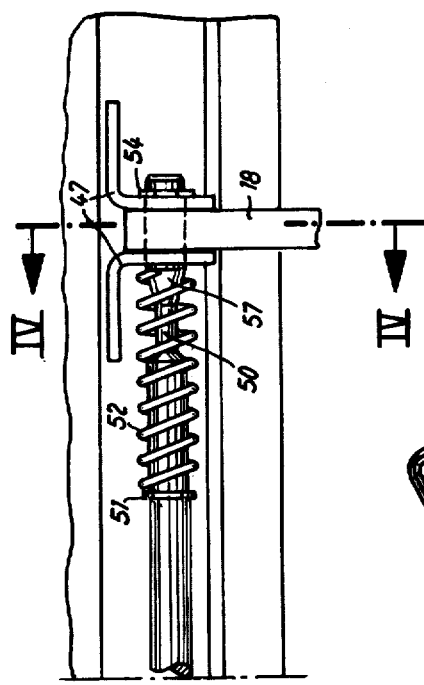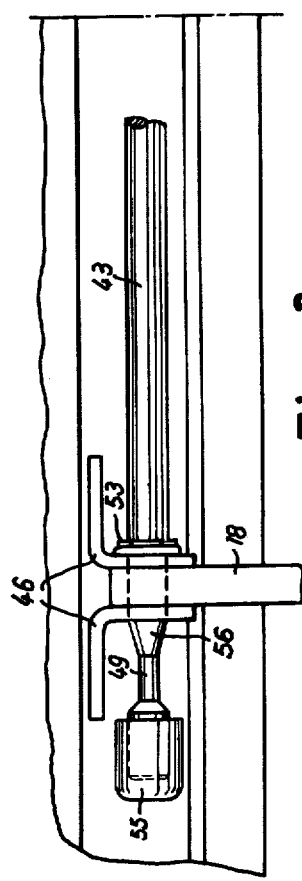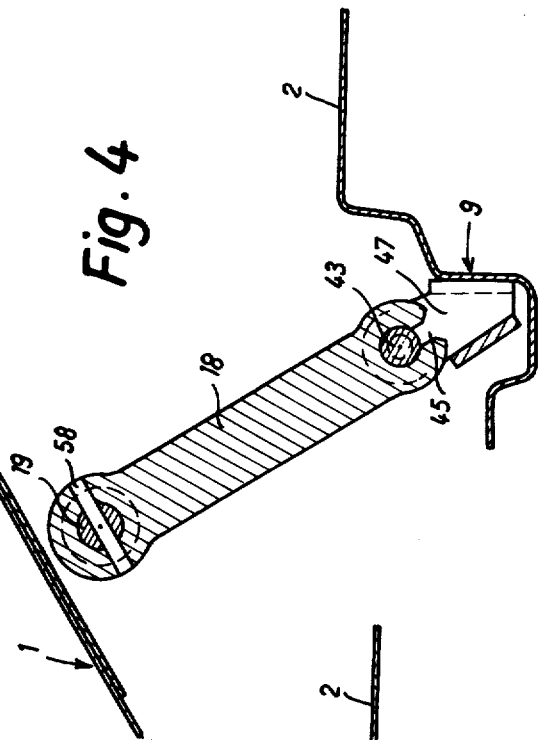

ered by the shaft and arrester means engaging thereon are removed together with the ventilator and returned together with it. For removing the ventilator it is only necessary to execute a short axial displacement of the bearing rod until the constrictions of the bearing rod are opposite to the slit bearing eyes of the link levers.

SLIDING ROOF FOR AUTOMOBILE ROOFS

BACKGROUND OF THE INVENTION

This invention relates to an improvement to the sliding roof for automobile roofs shown in U.S. Pat. No. 3,888,165 issued June 10, 1975 and assigned to the assignee of this application. The sliding ventilator is pivotally mounted in the vicinity of its front edge about a pivotal axis which is slidably guided laterally in a roof opening, and which can be displaced in an oblique position partially out of the roof opening into positions above the rear surface of the roof, by raising of the rear edge of the ventilator by means of two link levers, spaced apart one from another, pivotally attached to the ventilator near to its rear edge and swinging in a plane perpendicular to it, the other ends of these levers being pivotally journalled in the roof opening, these two link levers being connected to each other at their ends nearest to the ventilator by a shaft extending between them parallel to the sliding ventilator and rotatably mounted in bearing blocks attached to the sliding ventilator.

As shown in the aforementioned U.S. Pat. No. 3,888,165, provision is made for the sliding ventilator to be capable of being locked in any position by arrester means engaging on the shaft. The sliding roof is characterized especially in that its sliding ventilator is firmly supported in every position of opening, can be operated in a functionally reliable manner and permits infinitely variable adjustment of its ventilation setting. Thus the sliding roof can be adjusted to suit the particular speed of travel and individual ventilating requirements. The point of action for the arrester means, that is the bearing shaft, has proved to be a highly advantageous measure in practice, since in this way it is possible to apply the force effect necessary for the arresting action at a central point favourably situated for this purpose. A more detailed description of this operation can be found in the U.S. Pat. No. 3,888,165 which is herein incorporated by Reference.

The sliding roof disclosed in U.S. Pat. No. 3,888,165 permits however only a partial displacement of the sliding ventilator out of the roof opening, with the result that in no position of the sliding ventilator is the entire size of the roof opening utilized. The problem underlying this additional invention therefore is so to construct the sliding roof that by the use of simple means the entire roof opening area is exposed, but without the sliding ventilator being unsightly during driving.

SUMMARY OF THE INVENTION

According to the present invention, this problem is solved by making the ends of the link levers journalled in the roof opening able to be disconnected from their bearings, and when these link levers are disconnected, the front slide guide of the ventilator can be disengaged by sliding backwards. By these simple means, the sliding ventilator, after the link levers have been disconnected, can be removed from the vehicle roof by sliding it backwards, so that when desired the entire roof opening area is available. The removed ventilator can comfortably be transported in the vehicle, storage for this sliding ventilator being provided with advantage at a suitable position, for example in the boot (trunk) or on the boot lid. In one advantageous form of embodiment of this invention, provision is made that each link lever is provided with a slit bearing eye, the diameter of the eye being greater than the width of the slit, an axially displaceable bearing rod attached to the rear edge of the roof opening parallel to same and possessing, for each of the two link levers, a portion of the same diameter as the bearing eye and a constricted portion corresponding to the width of the slit, and in that the spacing between these constricted portions is equal to the spacing between the link levers. With this especially simple construction of the disconnection means, only the axially slidable bearing rod remains at the rear edge of the roof opening after the sliding ventilator has been removed, whereas the shaft and arrestor means engaging thereon are removed together with the ventilator and returned together with it. For removing the ventilator it is only necessary to execute a short axial displacement of the bearing rod until the constrictions of the bearing rod are opposite to the slit bearing eyes of the link levers.

The arrangement may with advantage be such that the bearing rod is slidably mounted in brackets attached to the rear edge of the roof opening, so that it may be pushed against the compression of a spring into a position in which the constrictions on this rod are situated in the slit bearing eyes. This form of construction ensures that the sliding ventilator is protected against unintentional release from the bearing rod, because the spring holds the bearing rod in the locking position.

BRIEF DESCRIPTION OF THE DRAWINGS

The invention is explained in more detail below with reference to the drawings illustrating one embodiment. The drawings show:

FIG. 1 a section through the sliding ventilator and adjacent roof regions in an intermediate open position of the ventilator, FIG. 2 a section similar to FIG. 1, after the ventilator has been disengaged and unhinged, FIG. 3 to a larger size and partly cut away, a plan of the bearing rod and the parts connected to it, FIG. 4 a section along line IV—IV of FIG. 3 in an open position of the sliding ventilator similar to FIG. 1 and, FIG. 5 a broken away section similar to FIG. 4, showing the parts after they have been unlocked.

DESCRIPTION OF THE INVENTION

In FIGS. 1 and 2, the sliding ventilator designated generally 1 can be seen, the outer cover plate 3 of which follows the curvature of the roof 2. The cover plate 3 is furnished all round with a perpendicular flange 7. The frame 9 surrounding the roof opening is, in the example shown, formed from the roof 2 itself and possesses the same section all round. Above the rain water gutter 10 of the frame 9 is the peripheral projecting step 11, which fits tightly against the flange 7 of the cover plate 3 in the closed state of the sliding roof with an edge gap seal (not shown) between them pushed onto the flange 7.

On each side of the sliding ventilator 1, the short guide rail 13, on which the sliding shoe 14 is guided, is attached to the frame 9. The forwardly and upwardly directed bearing extension 15 of the sliding shoe 14 is hinged to the bearing 16 by means of a bearing pin 17. The two bearing pins 17 opposite to each other constitute the forward pivoting axis of the sliding ventilator 1.

The link levers 18, which produce the outward swinging of the rear edge of the ventilator, are rigidly connected together by the shaft 19. The shaft 19 is rotatably mounted in the bearing blocks 20 attached to the sliding ventilator 1. The abutments 22 situated on the bearing blocks 20 serve for limiting the pivoting motion of the link levers 18. When the link levers 18 rest against the abutments 22, the sliding ventilator 1 is in its position of maximum opening, in which the largest width of the ventilating slot 8 between the forward edge of the cover plate 3 and the front part of the frame 9 is obtained.

The constructional arrangement so far described is the same as that of U.S. Pat. No. 3,888,165. In the drawings and consequently in the succeeding description, no illustration nor description will be given of the arresting and actuating means for the sliding ventilator 1, since these are not required for an understanding of the present invention. The arrester and actuating means which set upon the shaft 19 can be constructed in accordance with the above-mentioned patent.

The link levers 18 are releasably hinged to the rear part of the frame 9 by means of the bearing rod 43 in the manner now to be described. For this purpose, the link levers 18 are each furnished, at their end nearest to the roof opening, with a bearing eye 44, which is outwardly open through a slit 45. Associated with the bearing eye 44 and slit 45 is the bearing rod 43, which is axially slidably guided parallel to the rear edge of the roof opening on brackets 46 and 47, which are attached to the frame 9. The bearing rod 43 is passed through appropriate bores 48 in these brackets 46 and 47. The bearing rod 43 possesses over the greater part of its length a diameter approximately equal to the diameter of the bearing eyes 44. In the vicinity of the brackets 46 and 47, the bearing rod 43 is furnished with constrictions 49, 50 respectively, the diameter of which is such that these constrictions can pass freely through the slits 45. The mutual spacing between the constrictions 49 and 50 is equal to the center-to-center distance between the brackets 46 and 47 or between the link levers 18.

As can be seen from FIG. 3 an annular collar 51 is fixed on the bearing rod 43; a helical compression spring 52, pushed onto the bearing rod 43, bears against this annular collar and pushes with its other end under prestress against the bracket 47. Also attached to the bearing rod 43 are abutment flanges 53 and 54, which ensure that the prestressed helical compression spring 52 cannot push the bearing rod 43 so far towards the left (referred to the drawing), that the bearing rod comes out of engagement with the bracket 47. An actuating knob 55 is attached to the free end of the bearing rod 43.

To remove the sliding ventilator, the sliding roof should first be opened, by loosening the arrester device and sliding towards the rear until the actuator knob 55 is accessible. If this knob is then pressed to the right against the force of the spring 52, the knob 55 possibly abutting against the bracket 46, then the bearing rod 43 displaces until its constricted portions 49 and 50 are situated in the bearing eyes 44 of the link levers 18. In this position, if the actuator knob 55 is held still, the sliding ventilator 1 can be raised, the link levers 18 together with their bearing eyes being lifted off the bearing rod 43. If the sliding ventilator 1 is now moved further backwards, then the sliding shoes 14 are removed from the guide rails 13. The sliding ventilator 1, after being pushed off, can be completely removed from the roof opening. After the link levers 18 have been lifted off the bearing rod 43, the actuator knob 55 can of course be released, whereupon the spring 52 automatically pushes the bearing rod 43 back into the position shown in FIG. 3.

To put the ventilator 1 back, the reverse sequence is used, that is the sliding shoes 14 are first slid onto the guide rails 13, before the link levers 18 are again brought into engagement with the bearing rod 43. For this purpose, the bearing rod 43 is first again pushed against the force of the spring 52, in order that the slits 45 can be pushed over the constrictions 49 and 50, until the constrictions are situated in the bearing eyes 44. It is not necessary here for the bearing eyes 44 to be set exactly coaxially to the bearing rod 43, because when the actuator knob 55 is released self-centering takes place between the axis of the bearing rod 43 and the centre of the bearing eyes 44 with the assistance of frustroconical transitions 56 and 57. The frustoconical transitions 56 and 57 join the constrictions 49 and 50 of the bearing rod 43 to portions of larger diameter of the bearing rod. The fitting of the bearing eyes 44 onto the bearing rod 43 does not present any special difficulty, because the link levers 18 are oriented parallel to each other and also positively retain their parallel position, because they are torsionally keyed to the shaft 19, for example by transverse pins 58 (FIG. 4).

Reference numeral 42 designates an internal lining, which is fixed to the sliding ventilator to cover up the arrester means, not shown, and stiffening members.

We claim:

1. In a sliding ventilator for an automobile roof having an opening therein, a ventilator plate, means for pivotally mounting said ventilator plate in the vicinity of the front edge thereof about a pivotal axis which is slidably guided in the roof opening, means including link lever means for displacing said ventilator plate in an oblique position partially out of the roof opening into positions above the surface of the roof, said link lever means comprising two spaced apart link levers pivotally attached to said ventilator plate near the rear edge thereof and pivotal in planes perpendicular thereto, said link levers being pivotally journalled in the roof opening, shaft means extending parallel to said ventilator plate and rotatably mounted on said ventilator plate, said link levers being disengageably connected to said shaft, each of said link levers having a slit therein terminating in an eye having a diameter exceeding the width of the slit, an axially slidable bearing rod mounted on the rear edge of the roof opening and parallel thereto, said rod having, for each of said two link levers, a portion having a diameter substantially corresponding to the diameter of the eye and a constricted portion having a diameter substantially corresponding to the width of the slit, the spacing between said constrictions being substantially equal to the spacing between said link levers.

2. The combination according to claim 1 in which said bearing rod is slidably mounted in brackets attached to the rear edge of the roof opening and being slidable against a spring pressure into a position in which said constricted portions are situated in said eye.